HIGH GAIN ALL CHANNEL TELEVISION ANTENNA

Filed June 28, 1968 5 Sheets-Sheet 1

Inventors
John R. Winegard
Carey W. Shelledy
By Burmeister, Kulie & Southard
Attorneys

HIGH GAIN ALL CHANNEL TELEVISION ANTENNA

Filed June 28, 1968 5 Sheets-Sheet 2

Inventor
John R. Winegard
Carey W. Shelledy
By Burmeister, Kulie & Southard
Attorneys

HIGH GAIN ALL CHANNEL TELEVISION ANTENNA

Inventors
John R. Winegard
Carey W. Shelledy
By Burmeister, Kulie & Southard
Attorneys Sept. 29, 1970 J. R. WINEGARD ET AL 3,531,805

HIGH GAIN ALL CHANNEL TELEVISION ANTENNA

Filed June 28, 1968 5 Sheets-Sheet 4

Inventors
John R. Winegard
Carey W. Shelledy
By Burmeister, Kulie & Southard
Attorneys Inventors
John R. Winegard
Carey W. Shelledy
By Burmeister, Kulie & Southard
Attorneys United States Patent Office 3,531,805
Patented Sept. 29, 1970

3,531,805
HIGH GAIN ALL CHANNEL TELEVISION ANTENNA

John R. Winegard and Carey W. Shelledy, Burlington, Iowa, assignors to Winegard Company, Burlington, Iowa, a corporation of Iowa Filed June 28, 1968, Ser. No. 741,064
Int. Cl. H01q 21/00, 9/26, 19/12
U.S. Cl. 343—727 9 Claims

ABSTRACT OF THE DISCLOSURE

An improved all-channel television antenna characterized by exceptionally high gain and uniform response over the entire operating range with a compactness in overall size heretofore not obtainable. The structure includes a VHF section comprising interconnected dual VHF antenna bays selectively spaced from one another to provide vertical beam phasing for all VHF television channels for optimum reception, and a UHF section having a multi-element reflector system of interspersed half and full wave resonant elements arranged in a paraboloidal shaped configuration above and below a common broad band collector element.

This invention relates to an improved all-channel television antenna. More particularly, it relates to an improved television antenna having exceptionally high gain and uniformity of response across the entire operating range encompassing television channels 2 to 83. The antenna array forms a single integrated structure comprising interconnected dual VHF antenna bays selectively spaced from one another at an included angle so as to effect vertical beam phasing on all television channels in the VHF frequency range for optimum operating efficiency and compactness in overall size, and a UHF section having interspersed half and full wave resonant reflector elements arranged in a paraboloidal-shaped configuration about a broad-band collector element. The structure as a whole features a number of operational design features to insure sustained optimum performance of the antenna.

A real and substantial need has existed since the very inception of commercial television for a high gain antenna structure capable of efficient reception over its entire operating range. This is particularly so with respect to such antenna capable of efficient reception of signals on any or all television channels in the VHF and UHF bands, channels 2–83.

It is of course known that broad band signal amplifiers may be used in conjunction with antenna structures in outlying fringe areas to boost the signal to the television set. However, interposing such a signal amplifier device between the television antenna and receiver set is not always an acceptable solution. This is because the amplifier boosts or amplifies the entire signal input uniformly. Thus, if noise or other interference is present in some form or another at its input, it will be present at the output of the amplifier device. The composite "noise" figure is derivable from various factors. The balun used for impedance matching purposes is one example. The amplification stages of the amplifier device is another. The television set itself, particularly one that is several years old, may exhibit a 4 to 5 db noise figure. To those skilled in the art, "pure" signal gain produced by an antenna at its feed point is far more desirable than amplified signal gain as produced by a booster amplifier device.

However, effecting signal increases in the gain of an antenna becomes progressively more difficult past certain operational levels, particularly so for multi-element antenna structures intended for operation over broad frequency ranges. High gain in a single channel antenna such as the "Yagi" type is more readily attainable. Simply adding more directors in front of the driven element will generally produce progressively more gain. This cannot be done in multi-channel antennas designed to cover broader bands of frequencies, such as the entire VHF range. Simply increasing the number of driven elements in such an array is likewise not a solution because of the mutual interaction of all the various component parts. Moreover, stacking two or more broad band antennas is not the desired solution. While theoretically the gain of each antenna in such a configuration may be combined to form a composite signal in additive phase, in practice it is not obtained due to impedance mis-matches at various points along the operating band. The wider the band of operation, the greater the number of mis-matches at particular frequencies. In general, it can be said that acceptable impedance match between stacked antenna arrays in prior art structures was obtainable when there was a relatively narrow range of frequencies and the stacked antennas were spaced approximately one-half wave length apart.

The present invention relates to an integral antenna structure wherein interconnected dual VHF bays are incorporated which are selectively spaced from one another at less than a half wave length at the lowest operating frequency. Moreover, the VHF bays are arranged so that an included angle formed therebetween provides a progressive reduction in the physical spacing toward the front thereof to achieve vertical beam phasing as between the dual VHF bays. A separate UHF section is included wherein half and full wave reflector elements are arranged in a paraboloidal-shaped configuration above and below a broad band collector element. The respective antenna sections are interconnected by an open-wire transmission line in a manner to provide substantially constant 300 ohm characteristic impedance for the antenna structure as a whole across the entire operating range encompassing television channels 2 to 83.

It is therefore a general object of the present invention to provide an improved antenna structure capable of operating efficiently and effectively over the entire range of television channels and which is characterized by exceptionally high gain and uniformity of response.

A more particular object of the present invention is to provide an antenna of the foregoing type wherein dual antenna bays are employed for reception of signals in the VHF band, which bays are selectively spaced at less than a half wave length with reference to the lowest operating frequency.

Another object of the present invention is to provide an antenna of the foregoing type wherein the dual VHF bays are inclined toward one another to form an included angle therebetween whereby the physical distance between corresponding driven elements in each antenna bay diminishes towards the front of the antenna array.

Yet another object of the present invention is to provide an improved antenna of the foregoing type wherein the dual VHF bays are selectively spaced from one another whereby the distance between corresponding driven elements in each antenna bay remains substantially a constant in terms of wavelength at the operating frequency of said driven elements thereby phasing the VHF bays for optimum operating efficiency and minimizing the overall size of the antenna structure as a whole.

Still another object is to provide an antenna of the foregoing type wherein a UHF section is incorporated having a plurality of half and full wave resonant reflector elements alternately interspersed in a paraboloidal-shaped configuration about a broad band collector element to provide in-phase current fields for a high density magnetic screen.

Another object of the present invention is to provide an antenna of the foregoing type wherein the VHF bays and UHF section are interconnected by open-wire transmission lines wherein the respective impedances thereof are effectively matched to provide a substantially uniform impedance for the composite antenna structure as a whole over the entire operating frequency range encompassing television channels 2 to 83.

The novel features which are believed to be characteristic of the present invention are set forth with particularity in the appended claims the invention itself, however, together with further objects and advantages thereof, will be best understood by reference to the following description in conjunction with the drawings in which:

Figures 7A, 12:
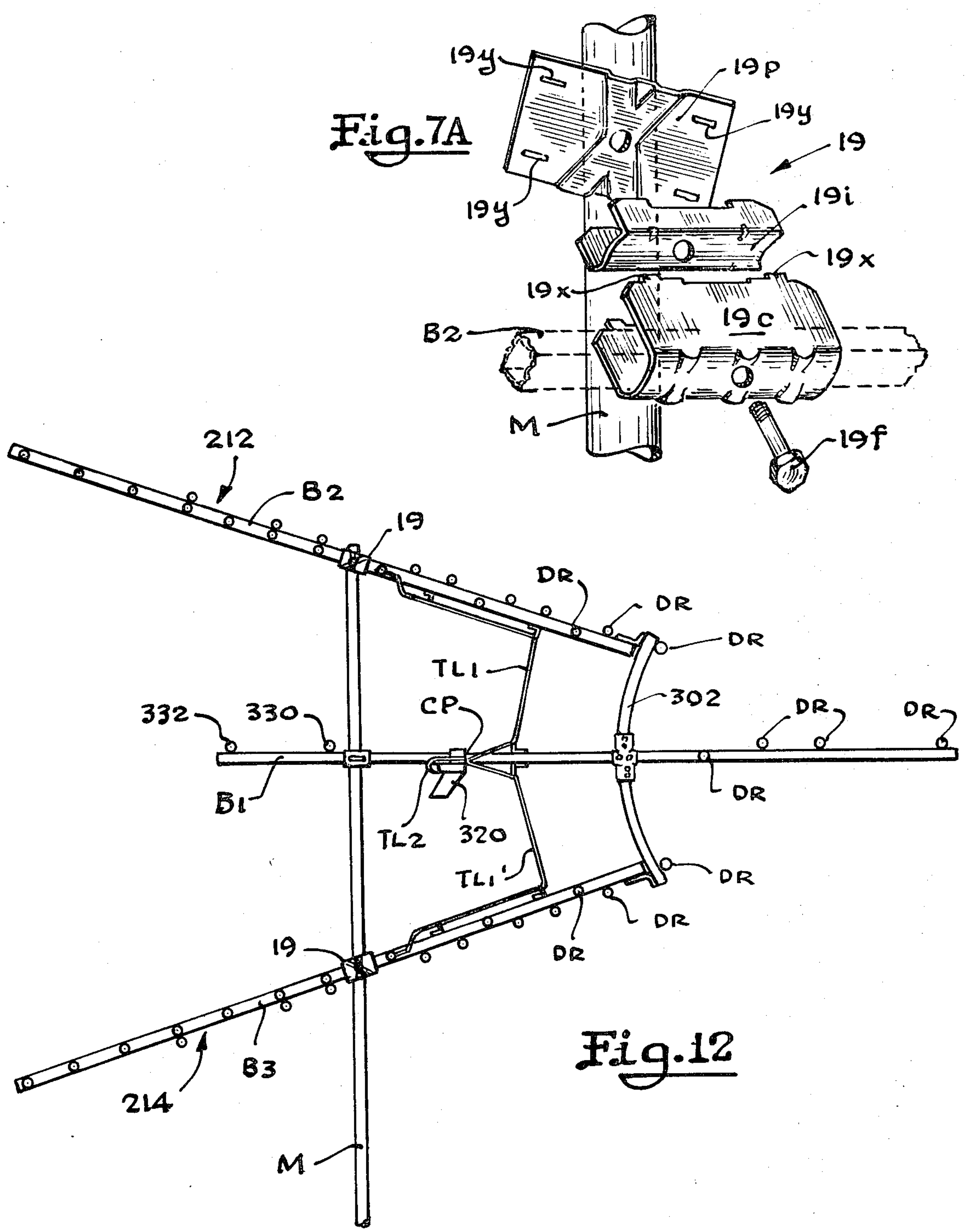
Figures 8, 9:
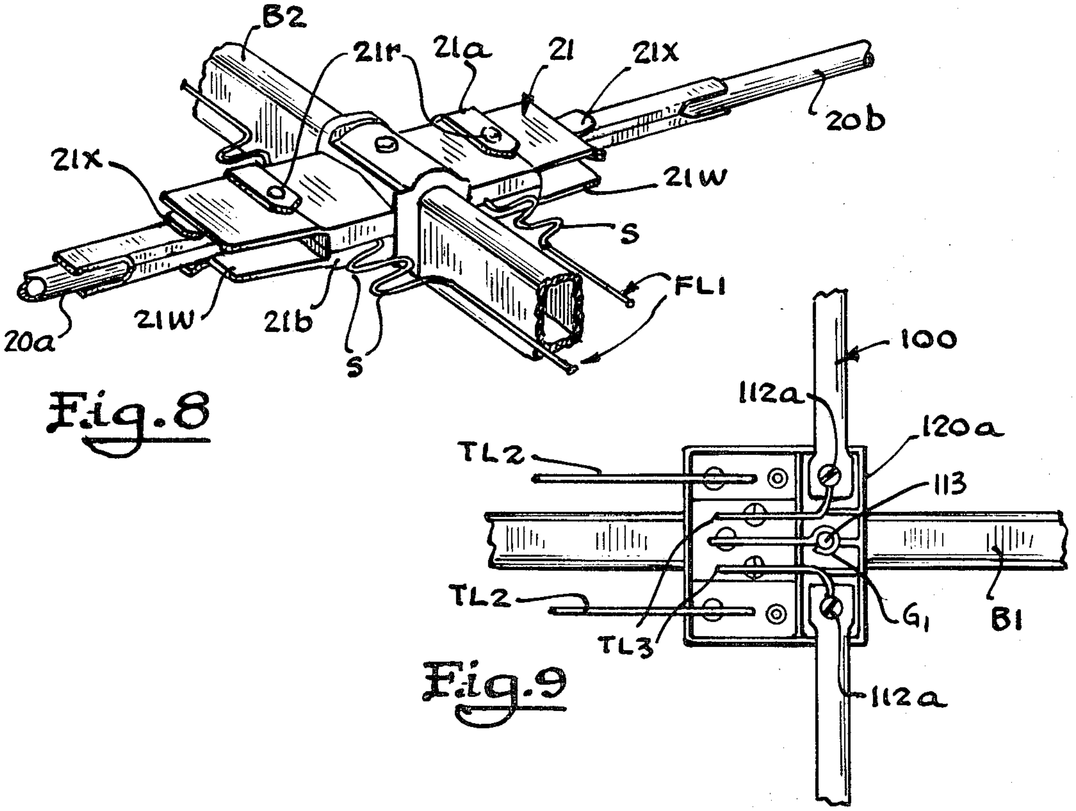
Figure 10:
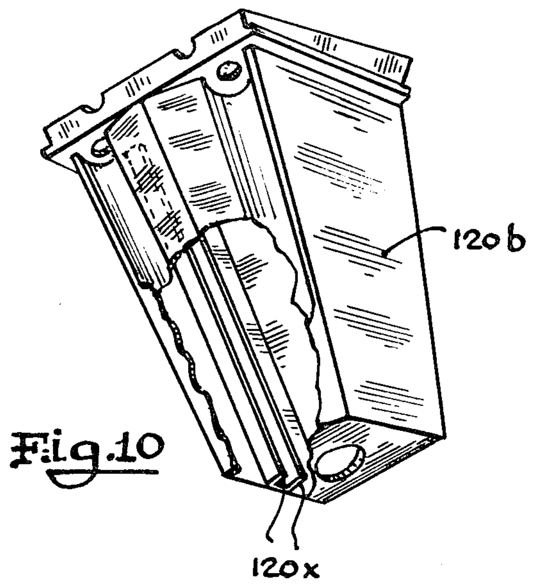
Figure 11:
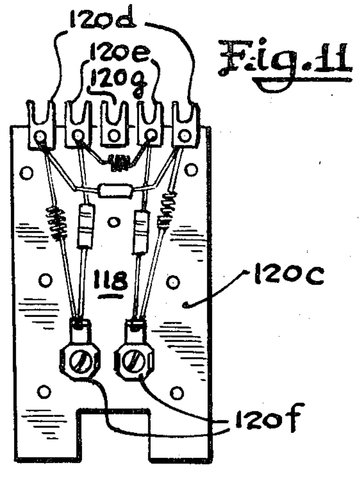

FIG. 7*a* is an enlarged view of the bracket assembly affixing the support boom of a VHF planar array to the vertical support mast;

FIG. 8 is an enlarged fragmentary view in perspective of wrap-around insulator support bracket for mounting the dipole elements of the dual VHF antenna bays;

FIG. 9 is an enlarged fragmentary bottom-plan view showing a detail of the respective feeder lines for the VHF and UHF portions of the antenna structure;

FIG. 10 is an enlarged fragmentary view in perspective of the cover portion of the coupler housing assembly;

FIG. 11 is a plan view of the circuit board and associated isolation and coupler circuitry insertable as a cartridge unit within the coupler housing; and FIG. 12 is a schematic representation of another embodiment of an antenna constructed in accordance with the present invention which is suitable for coverage of the VHF frequency range.

Referring now to the drawings, a television antenna 10 is illustrated which has been constructed in accordance with the present invention. The antenna 10 includes a very high frequency (VHF) section for reception of signals within the 54 mHz. to 88 mHz. range (television channels 2–6) and the 174 mHz. to 216 mHz. range (television channels 7–13) and an ultra high frequency (UHF) section for reception of signals within the 470 mHz. to 890 mHz. range (television channels 14–83). The VHF portion of the antenna 10 includes a pair of interconnected planar bays, indicated generally at 12 and 14. Each of the VHF antenna bays receives signals in the low and high VHF frequency bands, which signals are combined at a pair of reference terminals to which a single down lead may be connected, as described subsequently. The UHF section of the antenna 10 is indicated generally at 16. Signals received by the UHF sections 16 are likewise coupled to the same reference terminals.

Figures 1, 7:
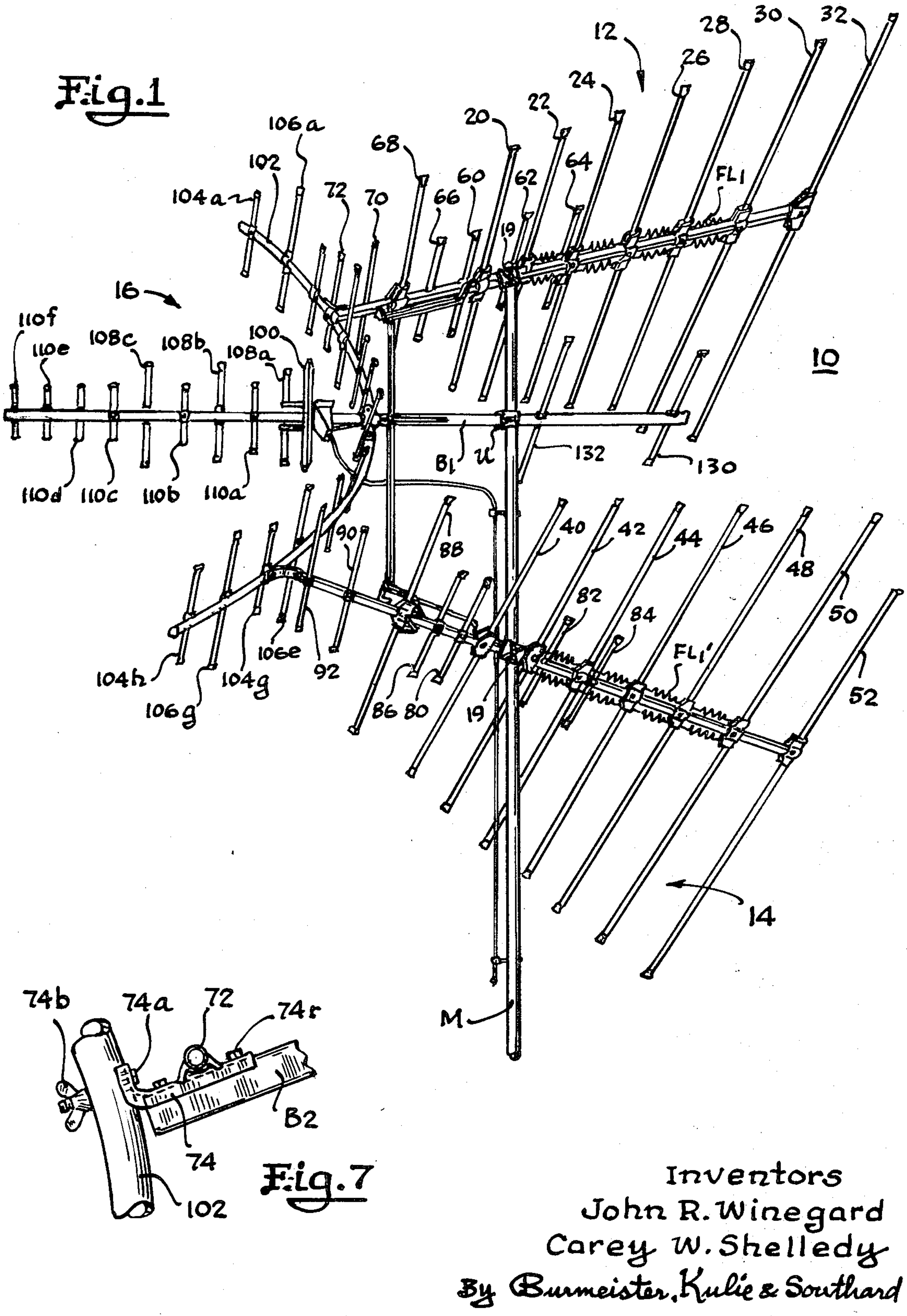
FIG. 1 is a view in perspective of a television antenna constructed in accordance with the present invention.
FIG. 7 is an enlarged fragmentary view showing a mounting detail of one of the VHF antenna bays to the UHF section.
Figures 2, 3:
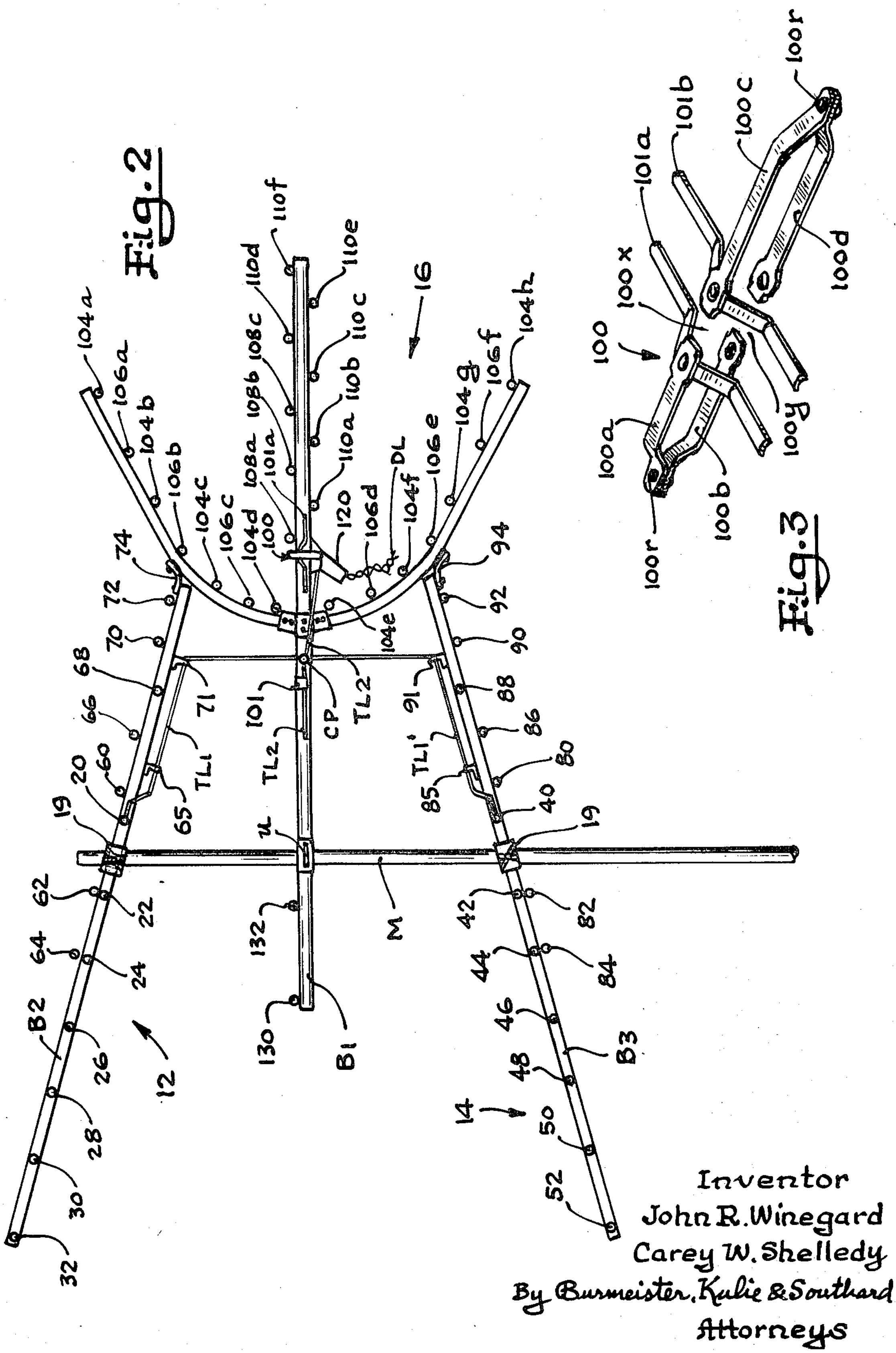
FIG. 2 is a schematic representation of the antenna of FIG. 1 shown in side view.
FIG. 3 is an enlarged view of the broad band collector element incorporated for reception of signals in the UHF band of frequency.

The antenna structure 10 as a whole is supported on a vertical support mast M to which the respective horizontal cross arms or booms B1, B2 and B3 are affixed by suitable means, such as a U-bolt clamp assembly U and mast bracket assembly 19 (best seen in FIGS. 2 and 7*a*). The bracket assembly 19 comprises a cover portion **19*c* and an insert 19*i*, within which the horizontal booms B2 and B3 are retained, and a bracket plate 19*p*. The cover portion 19*c* includes notched ear portions 19*x* which mate with openings 19*y* to provide an inter-locking action between the various bracket parts. Further, the plate 19*p* has an X formed channel within which the mast M is retained to provide the desired angle for the support boom B2 and B3 to the horizontal. A nut and bolt 19*f*** is used to hold the various parts securely together.

Each of the VHF antenna bays 12 and 14 includes a series of driven dipole elements in the form of simple or linear dipoles arranged in an aligned coplanar relationship to the axis of the respective booms B2 and B3, and supported thereon. VHF antenna bays 12 includes dipole driven elements 20 through 30, inclusive, and the VHF bay antenna 14 includes dipole driven elements 40 through 50, inclusive. It should be understood that a greater or lesser number of driven dipole elements may be provided without departing from the scope of the present invention.

Each of the dipole elements 20–30 and 40–50 is supported on the boom B2 or B3 by a saddle support bracket formed of suitable insulating material, such as indicated at 21 of FIG. 8. In one preferred form, bracket 21 is formed from a low-loss dielectric polystyrene material having high impact characteristics. It is to be understood that similar support brackets are used for mounting the other dipole driven elements and reflector elements, shorted internally, which are similar as the bracket 21 in FIG. 8.

Bracket 21 includes separate inter-locking halves **21*a* and 21*b*. Each bracket half is symmetrical so as to wrap around the boom B2 both at the top and bottom. Bracket halves 21*a* and 21*b* are secured together by suitable fastener means, such as by rivets 21*r* passing through clearance holes on respective sides thereof as illustrated. Bracket 21 when affixed about the boom B2, includes separate wing portions 21*w* extending laterally from the boom for mounting separate dipole arms 20*a* and 20*b* of the driven element 20 (best seen in FIG. 8). Additionally, the inner ends of the dipole arms 20*a* and 20*b* are enclosed within an associated interlocking bracket 21*x* which provides a positive locking action for the dipole arms 20*a* and 20*b*** when moved to a position perpendicular to support boom B2 and thereby effect a high resistance to flexure or other distortions and thus eliminate subsequent sagging and/or misalignment of the associated dipole arms due to wind loading, icing and the like.

Figures 4, 5, 6:
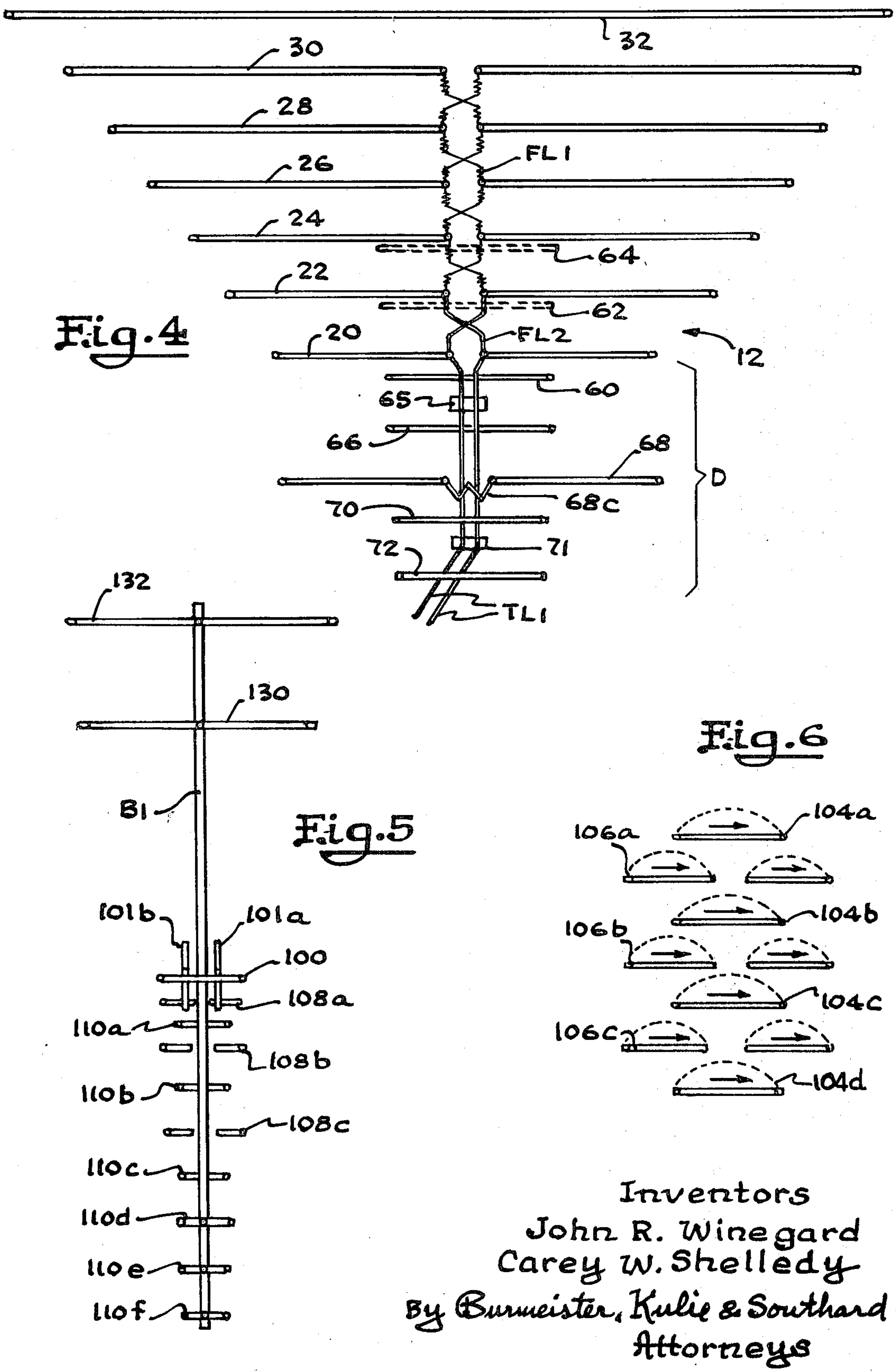
FIG. 4 is a schematic diagram of one of the antenna bays incorporated for reception of signals in the VHF frequency range.
FIG. 5 is a schematic diagram of the director and reflector elements spaced along the horizontal support boom of the composite antenna structure.
FIG. 6 is a partial schematic representation of the reflector system employed in the UHF section of the antenna structure showing the in-phase current fields.

Each of the VHF antenna bays 12 and 14 include a plurality of parasitic, that is non-driven, elements associated therewith. As shown in FIG. 4, the VHF bay 12 includes a reflector element 32 to the rear of the rear dipole driven element 30, a unitary parasitic element 64 located in vertical alignment with the dipole driven element 24 (on the top of driven element 24 when viewing FIG. 2), and also a parasitic element 62 located in vertical alignment with dipole driven element 22. The operation of these unitary parasitics will be described subsequently.

In addition, a director system D is located in front of the driven elements for VHF bay 12, comprising unitary director elements 60, 66, 70 and 72 and a dipole director element 68, all positioned in the manner illustrated. As shown, dipole director element 68 includes an associated coupler element **68*c* connected between the inner ends thereof. The dipole director element 68 is of a length such that, in combination with the coupler 68*c*, effective director action is provided for frequencies in the 54–88 mHz. range. On high VHF band operation, channel 7 through 13 the coupler 68*c*** in combination with stray capacitance between the inboard ends of the elements and the metalic boom B2 provides a relatively high impedance between the inboard ends of the director element 68 to cause the respective dipole arms to act as separate unitary director elements in this frequency range. A more detailed description of the action effected by a coupler of this type here identified as 68*c* may be found in U.S. Pat. No. 2,700,105, granted to John R. Winegard.

The VHF antenna bay 14 includes a reflector element 52 to the rear of dipole driven element 50, a unitary parasitic 84 in vertical alignment with dipole element 44, and a unitary parasitic element 82 in vertical alignment with dipole element 42. A director system D′ is located in front of the driven elements, and comprises unitary director elements 80, 86, 90 and 92 and a dipole director element 88.

The UHF section 16 (best shown in FIG. 2) comprises a broad band collector element 100 in conjunction with multi-element reflector and director systems. The reflector elements are selectively arranged on a paraboloidal-shaped support mast 102 position to the rear of, above and below, the collector element 100. The reflector elements are identified as elements 104*a* through 104*h*, inclusive, and elements 106*a* through 106*f*, inclusive. In the preferred form, reflector elements 104*a*–104*h* are half wave unitary elements with respect to a reference frequency slightly below the low end of the UHF band while reflector elements 106*a*–106*f* are full wave dipole elements with respect to the same reference frequency. As shown, the half wave resonant unitary elements 104*a*–104*h* and the full wave resonant dipole elements 106*a*–106*f* are alternately interspersed along the support mast 102 at progressively increasing spacings therealong.

The UHF director elements are identified at 108*a* through 108*c*, inclusive, and 110*a* through 110*g*, inclusive. In the preferred form, elements 108*a*, *b* and *c* are dipole elements which initially exhibit full wave resonance at a frequency in the upper half of the UHF band providing a cut-off at about channel 50 while elements 110*a* through 110*f* are unitary director elements half wave resonant at the same reference frequency. The director action of elements 108*a*–*c* and 110*a*–110*f* may be shifted if so desired as will be described subsequently. In addition, elements 108*a*–108*c* and 110*a*–110*f* are preferably alternately mounted above and below boom B1 as shown.

The UHF collector element 100 is in the form of a split-element folded dipole effective for the reception of UHF frequencies, as will hereinafter be described, and exhibits a characteristic impedance of approximately 280 ohms to closely match the nominal 300 ohm conventional twin lead down line DL interconnecting the antenna 10 and the receiver set (not shown). In the preferred form, collector element 100 (best seen in FIG. 3) has a total span of approximately 11¼″ in the horizontal direction and approximately 2″ in the vertical. As shown, the collector element may be conveniently and economically formed from four flat strips, 100*a*, *b*, *c* and *d*, suitably fastened at opposing ends by a rivet 100*r*, or the like. This provides two sets of terminals, 100*x* and 100*y*, at the top and bottom inboard ends, respectively. A pair of shorting stubs, 101*a*, and 101*b* are connected to the top inboard ends forming terminals 100*x*. The stubs are preferably formed of the same flat-wire strips and extend perpendicularly to the front and rear of the collector element 100 and substantially parallel to the boom B1, best seen in FIG. 2. The stubs preferably extend approximately 3″ to the front and approximately 4″ to the rear of the collector element 100.

It is to be noted that the dual VHF bays 12 and 14 and the UHF section 16 are all interconnected so that a single down lead DL may be utilized to the television receiver set (not shown). Signals from the various antenna sections 12, 14 and 16 are coupled to a coupler-isolation circuit 118 (see FIG. 11) mounted on a printed circuit board 120*c* insertable in a housing 120, which circuit provides isolation between the VHF and UHF antenna sections themselves, but a low impedance for signals therefrom to a pair of output terminals 120*f*.

As shown in FIG. 2, the output of the VHF antenna bays 12 and 14 are connected to a common connection point CP. That is, a transmission line TL1 interconnects the dipole driven element 20 of the VHF bay 12 and the connection point CP while a transmission line TL1′ interconnects the same connection point CP and the dipole driven element 40 of VHF bay 14. Transmission line TL2 is also connected to the connection point CP intermediate its length. The forward portion of transmission line TL2 terminates within housing 120 for coupling to circuit 118 while the rear portion remains as open-ended conductors. Brackets 65, 71, 85, 91 and 101 are employed to maintain the various transmission lines TL1, TL1′ and TL2 in the proper, spaced relationship to each other and to the associated booms B1, B2 and B3.

As best seen in FIG. 9, one pair of ends of transmission line TL2 terminate within the base portion 120*a* of the housing 120 as spaced open-wire conductors in the manner shown and form the VHF signal terminals for the antenna 10. The UHF signal terminals is formed by another transmission line TL3 which interconnects the bottom terminals 100*y* of collector element 100 at rivets 112*a*, and which line also terminates within the base portion 120*a* as smiilar spaced open-wire conductors. An additional conductor G1 is also provided, which is connected to ground at some suitable point, such as at rivet 113 affixed to the boom B1.

The coupler circuit 118 includes pairs of terminals 120*d* and 120*e*, for connecting to the two transmission lines TL2 and TL3, respectively, and the single terminal 120*g* for connection to the ground line G1. Coupler circuit 118 includes circuitry which provides a high degree of isolation between the terminals 120*d* and 120*e*, that is, between UHF and VHF portions of the antenna 10, while offering a low impedance path to a pair of reference terminals 120*f* to which the down lead DL is connected. Housing 120 also includes a cover portion 120*b* shown in FIG. 10, within which the printed circuit board 120*c* is inserted between respective upstanding channel guides 120*x* on opposing sides internal of the cover 120*b*. Cover 120*b* mates with a base portion 120*a* by suitable means, such as by machine screws or the like, (not shown).

It should be understood that, where desired, suitable amplification circuitry including isolation and band separation circuitry may be substituted for coupler isolation circuit 118 on the circuit board 120*c*. The amplfication circuitry may be non-selective—that is, providing amplification for signals in both the VHF and UHF ranges or, alternatively, selective to provide amplification in only the VHF or UHF range, while passing the non-amplified band.

The above description gives a general organization of the antenna 10 as shown in the drawings. A more specific construction will be better understood by reference to the following dimensions which were used in the construction of an antenna embodying the present invention.

VHF SECTION

| Element: | Lengths (tip-to-tip), inches |
|---|---|
| Unitary reflectors 32, 52 | 112 |
| Driven dipoles 30, 50 | 104 |
| Driven dipoles 28, 48 | 94 |
| Driven dipoles 26, 46 | 84 |
| Driven dipoles 24, 44 | 76 |
| Driven dipoles 22, 42 | 68 |
| Driven dipoles 20, 40 | 52 |
| Unitary elements 64, 84 | 28 |
| Unitary elements 62, 82 | 26 |
| Unitary directors 60, 80 | 26 |
| Unitary directors 66, 86 | 25 |
| Dipole directors 68, 88 | 52 |
| Unitary directors 70, 90 | 25 |
| Unitary directors 72, 92 | 24 |

Distances along the associated booms of the VHF antenna bays 12 and 14 between:

| | Inches |
|---|---|
| Elements **32–30** or elements **52–50** | 8½ |
| Elements **30–28** or elements **50–48** | 7 |
| Elements **28–26** or elements **48–46** | 7 |
| Elements **26–24** or elements **46–44** | 7 |
| Elements **24–22** or elements **44–42** | 7 |
| Elements **22–20** or elements **42–40** | 8 |
| Elements **20–60** or elements **40–80** | 2½ |
| Elements **60–66** or elements **80–86** | 6¼ |
| Elements **66–68** or elements **86–88** | 5¼ |
| Elements **68–70** or elements **88–90** | 4½ |
| Elements **70–72** or elements **90–22** | 6 |

Unitary parastic elements 62, 64, 82 and 84 are positioned in vertical alignment with each of their associated dipole driven elements 22, 24, 42 or 44, respectively, and spaced therefrom approximately 1½ inches.

The feeder lines FL1 and FL1′ are approximately 19 inches in physical length, with the feeder lines FL2 and FL2′ approximately 12½ inches in physical length. Transmission lines TL1 and TL1′ are approximately 31 inches in physical length, or a total of 62 inches between the connection point at dipole driven element 20 and that of dipole driven element 40. Transmission line TL2 is approximately 16 inches in physical length with the connection point CP being at its approximate mid-point, or 8 inches.

The vertical distance between corresponding dipole driven elements 30 and 50 of VHF bays 12 and 14 is approximately 60 inches which diminishes toward the front of the array to a distance of approximately 39 inches between corresponding dipole driven elements 20 and 40.

UHF SECTION

| | Inches |
|---|---|
| Length of the unitary reflector elements **104***a*–**104***h* | 15 |
| Length of the dipole reflector elements **106***a*–**106***f* | 25 |
| Length of the unitary director elements **110***a*–**110***f* | 7¼ |
| Length of dipole director elements **108***a*–**108***c* | 10¾ |

Vertical distance from center of boom B1 to center of reflector element:

| | Inches |
|---|---|
| **104***d* or **104***e* | 2¼ |
| **106***c* or **106***d* | 5¾ |
| **104***c* or **104***f* | 9½ |
| **106***b* or **106***e* | 13 |
| **104***d* or **104***g* | 15½ |
| **106***a* or **106***f* | 18½ |
| **104***a* or **104***h* | 22 |

Horizontal distance between centers of reflector elements:

| | Inches |
|---|---|
| **104***d* and **106***c* or **104***e* and **106***d* | 2 |
| **106***c* and **104***c* or **106***d* and **104***f* | 2¼ |
| **104***c* and **106***b* or **104***f* and **106***e* | 3 |
| **106***b* and **104***b* or **106***e* and **104***g* | 4½ |
| **104***b* and **106***a* or **104***g* and **106***f* | 5½ |
| **106***a* and **104***a* or **106***f* and **104***h* | 6 |

Horizontal distance between:

| | Inches |
|---|---|
| Center of mast **102** and collector **100** | 5 |
| Collector **100** and dipole director **108***a* | 1½ |
| Dipole director **108***a* and unitary director **110***a* | 3 |
| Unitary director **110***a* and dipole director **108***b* | 3 |
| Dipole director **108***b* and unitary director **110***b* | 5 |
| Unitary director **110***b* and dipole director **108***c* | 5½ |
| Dipole director **108***c* and unitary director **110***c* | 5½ |
| Unitary director **110***c* and unitary director **110***d* | 5½ |
| Unitary director **110***d* and unitary director **110***e* | 5½ |
| Unitary director **110***e* and unitary director **110***f* | 6 |

Another embodiment of the present invention is illustrated in FIG. 12. In this embodiment, no UHF reception is contemplated such that the antenna structure may be optimized for reception of signals in the VHF frequency range.

In this configuration, elements which correspond to those previously described for the embodiment in FIGS. 1–11 have been given the same letter symbols, such as transmission lines $TL_1$ and $TL_1'$, support booms $B_2$, $B_2$ and $B_3$, and support mast M. Those elements in the embodiment of FIGS. 1–11 having a numerical identification and which have a counterpart in the embodiment of FIG. 12 are indicated by like reference in the latter, with 200 added thereto.

As shown, the embodiment of FIG. 12 includes VHF planar bays 212 and 214 interconnected by transmission lines $TL_1$ and $TL_1'$ to a common connection point CP. Each of the VHF bays 212 and 214 include seven dipole driven elements cut to lengths for resonant action at frequencies spread across the low VHF band, although it is to be understood that the number of dipole driven elements is in no way critical.

In the embodiment of FIG. 12, additional unitary and dipole director elements are included on support booms $B_2$ and $B_3$ to the front of the dipole driven elements as well as on the horizontal support boom $B_1$. These additional director elements present in the embodiment of FIG. 12 which are not included in the embodiment of FIGS. 1–11 are identified generally as DR. It is to be understood that, functionally, the operation of the antenna structure shown in FIG. 12 is the same as that described for the VHF planar bays 12 and 14 in FIGS. 1–11.

PRACTICAL OPERATION

For UHF operation, the collector element 100 functions as the active or driven element. As mentioned previously, collector element 100 is in form of a split-element folded dipole having a characteristic impedance of approximately 280 ohms. Collector element 100 is approximately half wave resonant at the lower end of the UHF band (470 mHz.) and three-quarter to full wave resonant at the upper end of the UHF band (890 mHz.).

Collector element 100 differs from the conventional folded dipole in that the upper dipole arms are not continuous but "split" so as to form separate inboard ends. However, with the feeder stub 101*a* and 101*b* extending from these inboard ends, a low impedance, or R-F short, is presented thereacross at frequencies within the UHF band. At the same time, a relatively high impedance is presented thereacross at frequencies below the UHF range, and particularly at frequencies within the VHF band. Thus, the collector element 100 functions as a conventional folded dipole element at UHF frequencies with substantially no effect on its performance characteristics. The feeder stubs 101*a* and 101*b* further serve to broaden the response of the collector element for effective reception of signals across the UHF band channels 14 to 83, inclusive.

As mentioned previously, the reflector elements 104*a*–104*h* and 106*a*–106*f* are positioned transverse the support mast 102 formed in a paraboloidal-shaped configuration. Such an arrangement greatly increases the gain of section 16 at the low end of the UHF band by effecting a substantial increase in the vertical capture area presented thereby. A focusing effect on the collector element 100 is obtained that is not present for conventional corner reflector systems or similar structures. However, it has been found that for optimum performance, the reflector system should comprise interspersed full and half wave resonant elements selectively spaced along the support mast and from each other. This can be seen more clearly in FIG. 6 wherein the top half of the reflector system is illustrated comprising elements 104*a*–104*d* and 106*a*–106*c*. As will be noted, the interspersed half and full wave resonant elements are arranged at selective locations along the support mast 102 and with respect to each other whereby a high intensity magnetic screen is provided so that the respective current fields are in-phase for additive action at the collector element 100. Incorporating reflector elements all of one type and size, such as all unitary half wave resonant elements or all full wave dipole resonant elements, would not effect the foregoing operational feature of interlaced magnetic fields. There would be either cancellations in these fields or gaps that develop at various locations therein such that a loss in potential gain of the antenna section results.

At the high end of the UHF band, the gain characteristics of the UHF section 16 are also improved by the unitary and dipole director elements 108*a*–108*c* and 110*a*–110*f*, respectively. In the preferred form, the elements are alternately mounted above and below the support boom B1. Elements 108*a–c* are preferably full wave resonant dipole directors and elements 110*a–f* half-wave resonant unitary directors.

For VHF band operation, (channels 2–13), each of the dual VHF antenna bays 12 and 14 function in the same manner, but substantially independent of one another, with the signals developed thereby being added together at the input of the coupler-isolation circuit 118. For convenience, only the operation of the VHF bay 12 is described, with the understanding that the same applies to VHF bay 14.

For reception of signals in the low VHF band (channels 2–6) the dipole elements 20 through 30 are cut to lengths to provide resonance at frequencies spread over the band. For example, for channel 2 operation, dipole element 30 may be cut to approximately half wave resonance for effective reception of signals on that frequency. Reflector action is provided by the reflector 32 cut to resonate somewhat below the lower end of the low VHF band. At the other end of the VHF band, channel 6, one of the front positioned dipole elements, say dipole element 22, is cut to a length providing half wave resonance at that frequency. It is to be understood, however, that the respective VHF dipole elements do not individually become active or inactive at any particular frequency. Rather, more than one driven element contributes gain at most if not all frequencies.

Another factor to be considered in the operation of the VHF antenna bay 12 on low VHF band is the relatively close physical spacings maintained between the dipole driven elements 20 through 30 in combination with the feeder lines $FL_1$ therebetween. As best seen in FIG. 8, the feeder line $FL_1$ between these dipole elements include a series of sinusoites or reversing bends S in the plane of the antenna between adjacent dipole driven elements which make the lengths of the feeder lines substantially longer than the spacings between the dipole elements. The physical spacing between the respective dipole elements 20 through 30 is seen to be approximately seven inches while the interconnecting feeder lines $FL_1$ are of lengths on the order of 19 inches. The exact spacing between the dipole driven elements and the lengths of the interconnecting feeder lines, however, is not especially critical and may be varied over a reasonable latitude without substantially altering the performance characteristics.

On high VHF band, the dipole driven element 20 of the VHF antenna bay 12 serves as the primary signal pickup element in that range. With a physical length of approximately 52 inches, a half wave resonance of approximately 105 mHz. is seen to be obtained to improve overall directivity and impedance match characteristics of the VHF bay 12 with respect to the low VHF band. The same dipole element, taking into account capacitance end effects that are present, will be understood to exhibit approximately full wave resonance at the midpoint of the high VHF band, or around 195 mHz.

Unitary parasitic director 60 is placed in a parallel spaced relation to and in front of associated dipole driven element 20 to provide effective director action, and also placed in close enough proximity thereto so as to effect a reduction in the otherwise relatively high impedance exhibited by dipole element 20 on full wave resonance in the high VHF band. Unitary parasitic elements 62 and 64 serve to reduce the impedance of their associated dipole driven elements 22 and 24 as low as possible at their connection points to the feeder line $FL_1$ so that a high impedance may be reflected back across the feed point of the VHF bay 12 at the inboard ends of the dipole element 20 and thereby effect a decoupling action for the antenna structure to the rear of the dipole element 20 on high VHF band operation. To this end, parasitic elements 62 and 64 are mounted directly beneath of or directly over the associated dipole elements in direct vertical alignment therewith and spaced approximately 1 to 2 inches therefrom. Unitary parasitic elements 60, 62 and 64 may be cut to lengths to provide half wave resonance at the high end of the high VHF band, that is, at about 215 mHz., or higher. If preferred, unitary parasitic elements 64 may be cut to resonate slightly below 174 mHz. so as to provide additional reflector action in the high VHF band. The aforedescribed decoupling action for the dipole driven elements on high VHF band operation by the use of one or more associated parasitic elements is more fully described in U.S. Pat. 3,321,764, granted to John R. Winegard et al.

It will be observed that the dual VHF bays 12 and 14 are arranged in a configuration that forms an included angle therebetween rather than each being positioned in a substantially horizontal plane. This permits a number of operational advantages to be realized. This configuration ensures that optimum VHF capture area will be realized while effectively reducing overall antenna size for greater mechanical stability and reliability. In addition, it results in a flatter, more elongated vertical beam for greater directivity and a vertical beam phasing arrangement with respect to the planar bays 12 and 14 so as to effectively minimize spurious signal pickup from above and below the antenna array 10 as a whole.

When incorporating more than a single antenna bay, it has heretofore been the practice of spacing such antenna bays at a vertical distance which approximates a half wave at the lowest operating frequency. This permits a theoretical maximum vertical capture area, since the field developed about a dipole element at its fundamental resonance extends a quarter wave from the dipole in all directions. The half wave spacings insures there will be not overlap between the fields of the two vertically spaced dipole elements. With a lower operational limit of approximately 54 mHz., channel 2, this would require a spacing between the VHF antenna bays 12 and 14 of about 100 inches. However, the 100 inch spacing is not required for the dipole elements operating at higher frequencies than channel 2, say for example, dipole elements 22 and 42 which exhibit a half wave resonance at approximately 80 mHz. For this frequency of operation, the spacing therebetween, from a purely theoretical standpoint, need only be some 68 inches in magnitude.

However, it has been found that precisely half wave spacing need not be maintained between corresponding dipoles of each VHF antenna bay for effective operation. In fact, in the preferred embodiment of the present invention, the corresponding dipole elements in each of the VHF bays 12 and 14 are spaced at approximately 0.3 wavelength of their fundamental frequency. It has been found that, with the present antenna structure, there is no substantial interaction of the respective fields at these spacings were manifested and thus no significant loss of potential gain for the overall antenna structure. At the same time, however, a substantial reduction in overall size of the antenna is effected. It can be seen that the vertical spacing between dipole elements 30 and 50 is reduced from 100 inches, previously thought to be required, down to 60 inches, representing an approximate 40% reduction. For the dipole elements 20 and 40, the spacing may be reduced from the 100 inch figure down to only 39 inches, or a 60% reduction.

With the VHF planar bays inclined toward one another as previously mentioned, a vertical beam phasing arrangement is obtained with respect to the interconnected bays 12 and 14 on VHF band which is effective to minimize spurious signal pickup from immediately above or below the antenna array 10. This has a particularly significant effect on the problem of airplane flutter, auto iginition noise, and the like, commonly encountered in television signal reception.

The vertical phasing arrangement arises by reason of the selected vertical distance between corresponding dipole driven elements in each of the VHF planar bays. It will be realized that a cancellation or neutralization of spurious signal energy emanating from immediately above or below the antenna 10 may be effected within the interconnected VHF bays 12 and 14 if the proper phase relationship is obtained therebetween. That is to say, cancellation of spurious signal energy will tend to occur in a dipole element acting as the initial pickup element, if the same spurious signal energy is also picked up by a corresponding dipole element in the other VHF planar bay and re-radiated back to the initial dipole element, if such re-radiated energy arrives in substantial phase opposition thereto. The phase reversal in the spurious signal pickup above or below the antenna 10 is of course primarily a function of the vertical distance separating the particular corresponding dipole elements in the respective VHF antenna bays 12 and 14. It has been found that the distances provided in the embodiments of the present invention as set forth above are indeed effective to achieve the desired cancellation of spurious signal pickup within the VHF band. Moreover, the vertical phasing arrangement is not just effective at one particular frequency, or narrow band of frequencies, but is maintained substantially throughout the VHF band. As previously noted, while the vertical spacing between successive corresponding dipole elements in the VHF bays 12 and 14 progressively decreases from the rear toward the front of the array, the distance in terms of wavelengths at the resonant frequencies exhibited by the respective dipoles remains substantially the same that is, within a range of 0.3 to 0.35 wavelength.

The front-to-back ratio of the antenna 10 on high VHF band operation is further improved by the action of unitary elements 130 and 132. Elements 130 and 132 are approximately 35 inches and 38 inches, respectively, and are effective for reflector action for the high VHF band. Separate reflector elements 32 and 52 are provided for the low VHF band.

Still another factor to be considered if efficient operation is to be achieved for VHF band operation is the impedance presented by the dual VHF bays 12 and 14 across the entire VHF band, channels 2–13, when connected in parallel as previously described. The optimum condition, of course, is for the VHF bays 12 and 14, each designed to exhibit a nominal 300 ohm characteristic impedance across the VHF band, to present the same nominal 300 ohm impedance when electrically interconnected in the manner described.

In operation, the VHF bays 12 and 14 are interconnected by the respective sections of transmission lines $TL_1$ and $TL_1'$, each extending from the common connection point CP to the feed point of the respective VHF bays 12 and 14 at the inboard ends of the front dipoles 20 and 40, respectively. Transmission lines $TL_1$ and $TL_1'$ are in the form of parallel, open-wire conductors which exhibit a characteristic impedance on the order of 425 ohms. It has been found that satisfactory impedance characteristics are obtained for low VHF band operation when the lengths of the transmission lines $TL_1$ and $TL_1'$ are each approximately a quarter-wave at the high end of the low VHF band, or channel 6. The nominal 300 ohm impedance of the VHF bays 12 and 14 are transformed upwardly to approximately 600 ohms each at connector point CP, which in parallel provide the desired 300 ohms impedance characteristic at the input to the coupler-isolation circuit 118. However, it has also been found that due to the interaction of the various component parts comprising the VHF bays 12 and 14, as occurs in any multi-element antenna structure, the desired uniform impedance characteristics are not maintained for the entire VHF band, and particularly at the high end of the VHF band at channel 13.

The impedance characteristics of the VHF bays 12 and 14 as a composite unit are optimized at the high end of the high VHF band by the action of the transmission line $TL_2$. As described previously, the overall length of the line $TL_2$ is approximately 16 inches. The connection point CP is located at its approximate mid point and terminates in open-ended stubs extending to the rear of the connection point CP. Test results have shown this to be effective to raise the impedance characteristic of the VHF section of the antenna 10 at around channel 13 by virtue of approximate quarter wave stubbing action than would otherwise be present and thereby provide a more uniform impedance response across the entire VHF frequency band.

While only two embodiments of the present invention have been shown and described herein, it will, of course, be understood that other variations and modifications may be effected without departing from the true scope and spirit of the invention. The particular construction and specific dimensions of the various component parts comprising the antenna structures, the number of unitary and dipole elements, active and passive, and other factors may be varied to suit the convenience of the maker or user of the antenna structure. The appended claims are intended to cover all such modifications and alternative constructions that fall within their true scope and spirit.

What is claimed is:

1. A high gain television antenna for receiving signals on any television channel in both the VHF and UHF frequency ranges, comprising in combination:

a wedge-shaped support structure, said support structure including a curved vertical support mast in paraboidal-shaped configuration affixed to a first support boom arranged substantially horizontally, with second and third support booms extending rearwardly and outwardly from said paraboidal-shaped vertical mast at a predetermined angle to the horizontal;

a VHF antenna section, said antenna section including a pair of interconnected antenna bays for the reception of signals in the high and low VHF frequency bands, each bay having at least three dipole driven elements of lengths for receiving signals at selective frequencies within the low VHF frequency band, arranged in substantially coplanar relation along said second and third support booms, respectively, and interconnected by a feeder line transposed between adjacent dipole elements, with the front dipole driven element in each antenna bay forming the feedpoint thereof, said VHF antenna bays further having a parasitic element in association with at least two of said dipole driven elements to provide effective operation of said bays in the high VHF frequency band;

a UHF antenna section, said antenna section including a broad band collector element mounted on said first horizontal support boom for reception of signals in the UHF frequency band, a plurality of interspersed half and full wave resonant director elements alternately mounted above and below said first horizontal support boom and to the front of said collector element, and a plurality of half and full wave resonant reflector elements interspersed along said curved paraboidal-shaped vertical mast above and below said collector element;

a pair of unitary reflector elements of lengths to provide reflector action for the high VHF frequency band and arranged in parallel spaced relation between said VHF antenna bays on said first horizontal support boom; and means for interconnecting said VHF and UHF antenna sections, said means including a first transmission line means interconnecting the feed points of said VHF antenna bays, an isolation and coupling circuit, second transmission line means interconnecting said first transmission line means at its approximate midpoint and said coupling circuit, and third transmission line means interconnecting said UHF collector element and said coupling circuit.

2. A high gain television antenna in accordance with claim 1 wherein said second and third support booms of said VHF antenna bays forming said predetermined angle to the horizontal effect a physical spacing between corresponding dipole driven elements of each antenna bay which is less than a half wave at the fundamental resonant frequency of said corresponding dipole driven elements.

3. A high gain television antenna in accordance with claim 2 wherein the physical spacing between corresponding dipole driven elements of the respective VHF antenna bays is about 0.3 to 0.35 wavelength of said fundamental resonant frequency of said corresponding dipole driven elements.

4. A high gain television antenna in accordance with claim 1 wherein said first transmission line means interconnecting the feedpoints at the front dipole elements of each VHF antenna bay is of a length corresponding to approximately a half wave at the high end of the high VHF frequency band while the vertical spacing between said front dipole elements is about 0.3 to 0.35 wavelength at said same reference frequency.

5. A high gain television antenna in accordance with claim 1 wherein said isolation and coupling circuit includes a printed circuit module insertable within a weatherproof housing attached to the first support boom and wherein said isolation and coupling circuit provides a predetermined isolation between the VHF and UHF antenna sections while effecting a substantially low impedance for signals from each of said antenna sections to a pair of common terminals forming the output of said isolation and coupling circuit.

6. A high gain television antenna in accordance with claim 1 wherein the half and full wave resonant reflector element mounted on said curved paraboidal-shaped vertical mast above and below said collector element are selectively spaced from said collector element and from each other so as to produce in-phase current fields for a high density magnetic screen for said collector element.

7. A high gain television antenna in accordance with claim 1 wherein the front dipole element of each VHF antenna bay is of a length to provide full wave resonance at a midpoint frequency within the high VHF band and thereby serve as the primary pick-up element for said high VHF band, wherein said first parasitic element associated with said first dipole driven element is of a length for half wave resonance at the high end of the high VHF band and in close proximity thereto so as to reduce the characteristic impedance of said front driven dipole on high VHF band operation to a nominal 300 ohms, and wherein said second parasitic element is placed in vertical alignment with another of said VHF dipole driven elements and spaced therefrom approximately 2 inches so as to provide a decoupling action from said front dipole driven element for high VHF band operation.

8. A high gain television antenna in accordance with claim 1 wherein the collector element is in the form of a split-element folded dipole forming pairs of terminals at the inboard ends of the upper and lower dipole arms with a pair of parallel spaced feeder stubs extending to the front and rear of the upper terminals of said collector element, said feeder stubs effecting a substantially low impedance across said upper terminals for signals within the UHF frequency range while effecting a substantially high impedance for signals within the VHF frequency range.

9. A high gain television antenna in accordance with claim 1 wherein the feeder lines transposed between adjacent dipole driven elements of each VHF antenna bay includes a plurality of reversing bends therein whereby the physical length of said feeder lines is approximately three times the physical spacing between adjacent dipole driven elements.

References Cited

UNITED STATES PATENTS

| | | | |
|---|---|---|---|
| 2,756,420 | 7/1956 | Kolar et al. | 343—727 |
| 2,923,007 | 1/1960 | Carpenter | 343—727 |
| 3,235,868 | 2/1966 | Wells | 343—727 |

HERMAN KARL SAALBACH, Primary Examiner

T. VEZEAU, Assistant Examiner

U.S. Cl. X.R.

343—803, 816, 817, 840, 844